(12) United States Patent
Diamond et al.

(10) Patent No.: US 9,432,344 B2
(45) Date of Patent: Aug. 30, 2016

(54) SECURE STORAGE AND SHARING OF USER OBJECTS

(71) Applicant: Low Gravity Innovation, Inc., Newcastle, WA (US)

(72) Inventors: Jeffrey M. Diamond, Newcastle, WA (US); Nathaniel R. Diamond, Newcastle, WA (US)

(73) Assignee: LOW GRAVITY INNOVATION, INC., Newcastle, WA (US)

( * ) Notice: Subject to any disclaimer, the term of this patent is extended or adjusted under 35 U.S.C. 154(b) by 50 days.

(21) Appl. No.: 14/216,532

(22) Filed: Mar. 17, 2014

(65) Prior Publication Data

US 2014/0281482 A1 Sep. 18, 2014

Related U.S. Application Data

(60) Provisional application No. 61/794,328, filed on Mar. 15, 2013, provisional application No. 61/803,058, filed on Mar. 18, 2013.

(51) Int. Cl.
*H04L 29/06* (2006.01)
*H04W 12/08* (2009.01)
*H04W 12/02* (2009.01)

(52) U.S. Cl.
CPC ........... *H04L 63/061* (2013.01); *H04L 63/102* (2013.01); *H04L 63/105* (2013.01); *H04L 63/168* (2013.01); *H04W 12/08* (2013.01); *H04L 63/0428* (2013.01); *H04W 12/02* (2013.01)

(58) Field of Classification Search
CPC .................................................... H04L 63/061
USPC ......................................................... 713/151
See application file for complete search history.

(56) References Cited

U.S. PATENT DOCUMENTS

| | | | | |
|---|---|---|---|---|
| 5,142,577 A | * | 8/1992 | Pastor | G07B 17/00733 380/51 |
| 5,386,564 A | * | 1/1995 | Shearer | G06F 9/4428 |
| 6,405,209 B2 | * | 6/2002 | Obendorf | G06F 17/30595 707/792 |
| 6,487,665 B1 | * | 11/2002 | Andrews | G06F 9/468 709/229 |
| 6,496,928 B1 | * | 12/2002 | Deo | G06F 1/3209 380/270 |
| 6,715,148 B1 | * | 3/2004 | Endicott | G06F 8/71 719/316 |

(Continued)

OTHER PUBLICATIONS

Briand et al., "Investigating Quality Factors in Object-Oriented Designs: an Industry Case Study", 1999.*

(Continued)

*Primary Examiner* — Ondrej C. Vostal
(74) *Attorney, Agent, or Firm* — Fenwick & West LLP

(57) ABSTRACT

Information objects model real-world objects or concepts that may be associated with users, such as vehicles, homes, people, animals, accounts, places, and the like. The objects have a set of associated properties, which have corresponding required protection levels indicating a level of permission that another user must have to the object in order to be able to receive and access the value of that property in the object. Objects are stored by a framework using techniques that reduce or eliminate the possibility of unauthorized access. For example, an object is durably stored in encrypted form in device storage, with the values of properties encrypted in different manners according to the different corresponding protection levels. When sharing an object with another user or other entity, the required protection levels of the object properties are respected in order to prohibit the other entity from obtaining access to unauthorized portions of an object.

20 Claims, 7 Drawing Sheets

(56) References Cited

U.S. PATENT DOCUMENTS

| | | | |
|---|---|---|---|
| 6,751,657 B1* | 6/2004 | Zothner | G06F 9/542 709/203 |
| 6,947,991 B1* | 9/2005 | Burton | H04L 63/083 707/999.01 |
| 7,051,038 B1* | 5/2006 | Yeh | G06F 17/30575 707/603 |
| 7,100,195 B1* | 8/2006 | Underwood | G06F 9/4443 707/999.009 |
| 8,755,064 B2* | 6/2014 | Kashibuchi | G06K 15/02 358/1.1 |
| 2002/0053020 A1* | 5/2002 | Teijido | H04L 63/0209 713/153 |
| 2002/0144106 A1* | 10/2002 | Enomoto | H04L 63/10 713/100 |
| 2002/0199123 A1* | 12/2002 | McIntyre | G06F 21/6218 726/3 |
| 2004/0085367 A1* | 5/2004 | Hagarty, Jr. | G06F 9/4443 715/854 |
| 2004/0098591 A1* | 5/2004 | Fahrny | G06F 21/72 713/176 |
| 2005/0039034 A1* | 2/2005 | Doyle | H04L 9/0825 713/193 |
| 2006/0059117 A1* | 3/2006 | Tolson | G06F 21/6209 |
| 2007/0073740 A1* | 3/2007 | Kirshenbaum | G06F 9/4428 |
| 2007/0171046 A1* | 7/2007 | Diem | G06Q 10/00 340/539.13 |
| 2007/0283443 A1* | 12/2007 | McPherson | G06F 21/6218 726/26 |
| 2008/0005689 A1* | 1/2008 | Evernden | G06F 8/24 715/765 |
| 2008/0141333 A1* | 6/2008 | Chen | G06F 21/6218 726/1 |
| 2008/0141381 A1* | 6/2008 | Walkoe | G06F 21/10 726/28 |
| 2009/0083429 A1* | 3/2009 | Krig | G06F 15/16 709/228 |
| 2009/0182770 A1* | 7/2009 | Madhavan | G06F 17/30873 |
| 2009/0182999 A1* | 7/2009 | Krig | H04L 63/061 713/156 |
| 2009/0193262 A1* | 7/2009 | Sweazey | H04L 9/0894 713/182 |
| 2013/0066843 A1* | 3/2013 | Nair | G06F 17/30115 707/694 |
| 2013/0212212 A1* | 8/2013 | Addepalli | G06F 9/461 709/217 |

OTHER PUBLICATIONS

Bushby et al., "BACnet: A Technical Update", 1994.*
Egenhofer et al., "Object-Oriented Modeling in GIS: Inheritance and Propagation", 1989.*
Kabaili et al., "Cohesion as Changeability Indicator in Object-Oriented System", 2001.*
Kim et al., "Query Performance Evaluation of OWL Storage Model", 2011.*
Krakowiak et al., "A generic object-oriented virtual machine", 1991.*

* cited by examiner

SECURE STORAGE AND SHARING OF USER OBJECTS

RELATED APPLICATIONS

The application claims the benefit of Provisional Application No. 61/794,328, filed on Mar. 15, 2013, and of Provisional Application No. 61/803,058, filed on Mar. 18, 2013, both of which are hereby incorporated herein by reference.

BACKGROUND

1. Field of Art

The present invention generally relates to the field of secure information management via one or more computing devices.

2. Description of the Related Art

Smart phones, personal digital organizers, personal computers, and other computing devices are capable of collecting, storing, and managing information and knowledge from many sources. However, in many cases, data related to a given topic may be scattered among multiple distinct locations and have many distinct data formats. For example, data identifying persons and entities may be accessible via a "contacts" application, database, service, and/or subsystem on a device, while passwords may be securely stored via a dedicated password manager application and/or service, and free-form notes on various topics may be accessible via a note-taking application and/or service.

Moreover, different applications and/or services may take very different approaches to protecting and sharing data. In many cases, users share data by sending unencrypted data via a general purpose communication medium, such as email or text message. Additionally, existing systems typically share data as a whole, without distinguishing between different levels of sensitivity that different portions of a data item may have.

Consequently, using existing technologies, it can be difficult to manage and share information among selected recipients, and can be still more difficult to share the information in a secure fashion.

BRIEF SUMMARY

A software framework enables the secure storage and sharing of information objects. The information objects model real-world objects or concepts that may be associated with users, such as vehicles, homes, people, animals, accounts, places, and the like. The objects are stored on a user's device and have a set of associated properties, which have corresponding required protection levels indicating a level of permission that another user must have to the object in order to be able to access the value of that property in the object. In one embodiment, the objects have associated types, which may be arranged in a type taxonomy, and which specify the various properties that a corresponding object can have.

The objects may have associations between themselves, such as an association between an object representing the user and an object representing the user's father, and an association between the object representing the user's father and an object representing the father's medication. Thus, information may be quickly located through chains of object associations, such as by selecting the object representing the user, then navigating to the user's father, and then again to the father's medication.

The objects are stored and shared by the software framework using techniques that reduce or eliminate the possibility of unauthorized access to the object information. For example, an object is durably stored in encrypted form in device storage, with the values of properties encrypted in different manners—e.g., with different encryption keys—according to the different corresponding protection levels. In one embodiment values of properties associated with a highest protection level are encrypted with a more complex scheme, and with a different key, than those associated with lower protection levels.

Additionally, in one embodiment the stored objects are loaded into primary memory by the framework according to a current access level of the user. When the access level of the user changes, properties with protection levels no longer viewable have their values removed from primary memory in order to make unauthorized recovery of the values more difficult.

Objects stored on one user device may be shared with other devices, both those owned by the same user, and those owned by different users. For example, the user could replicate all or some of his objects to another of the user's registered devices. As another example, the user could share with the device of someone having privileged access to the data (e.g., the user's wife), or with someone having lesser access to the data (e.g., the user's son's teacher), in which case that other user would be provided a more restricted instance of the object information, as specified by an access level assigned to that user.

When sharing an object with another user or other entity, the required protection levels of the object properties are respected in order to prevent the other entity from obtaining access to portions of an object for which they are not currently authorized. For example, in one embodiment, each object has an associated list of users or other entities with which it may be shared, along with a maximum granted access level specifying properties that the entity has been permitted to receive. Values for properties with protection levels matching the granted access level of a recipient user with whom the object is to be shared are included in an output object created for that user, and the output object is encrypted appropriately for that user before being transmitted to that user. For example, in one embodiment the framework generates a symmetric encryption key and encrypts the output object using the generated key. The framework also obtains a public key for the recipient user, encrypts the generated key with the public key to prevent other users from decrypting the object, and transmits the encrypted output object and the encrypted key to the recipient user.

Thus, the framework permits (for example) the secure storage on a user's device(s) of objects modeling real-world concepts associated with the user, such as the user's family, accounts, vehicles, residences, equipment, and the like, as well as the relationships between them. These objects can be shared with other users, and the framework ensures that the other users can receive the objects only to the degree that is appropriate for the access levels granted to those other users, being provided access to some portions of the object, but (perhaps) not to other portions. Other objects from other users can likewise be imported from other devices onto the user's device(s), and similarly viewed only to the degree appropriate for the user's current access level.

DETAILED DESCRIPTION

As described herein, users create dynamic knowledge objects from a taxonomy of types representing real-world objects, such as people, vehicles, schedules, plans, checklists, and the like. A software framework manages storage, access, duplication, and sharing of the objects.

Figure 1:
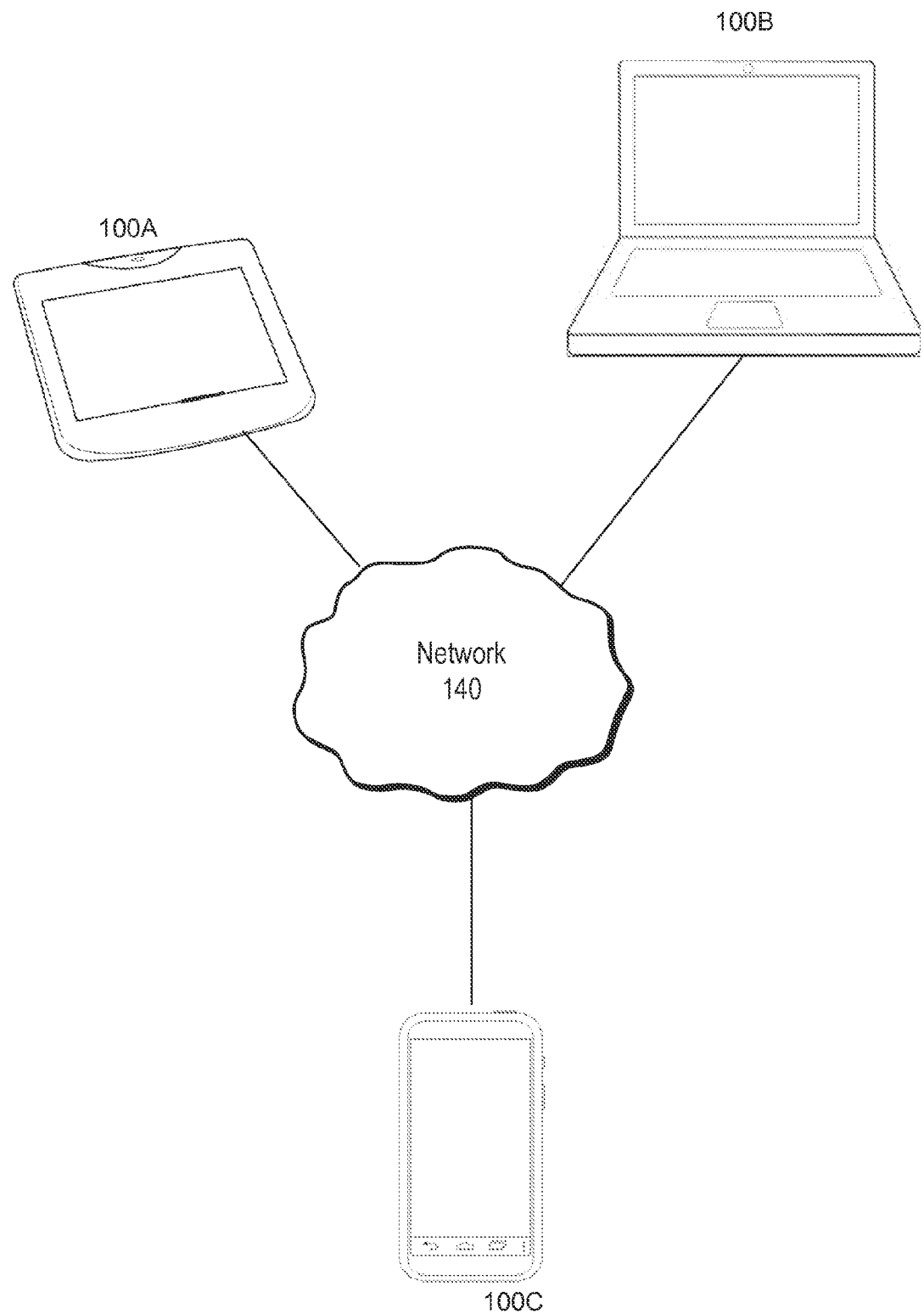
FIG. 1 illustrates a sample computing environment in which different user devices communicate with each other via the software framework over one or more networks to share the objects stored on one or more of the user devices.

FIG. 1 illustrates a sample computing environment in which different user devices 100 communicate with each other via the software framework over one or more networks 140 to share the objects stored on one or more of the user devices. Each participating user device 100 executes the software framework to ensure that information is stoned and shared securely. In one embodiment, the software framework is implemented as a service registered with the operating system.

In various embodiments, network 140 may include the Internet, a local area network ("LAN"), a wide area network ("WAN"), and/or other data network. In some embodiments, user devices 100A-C may communicate with one another via a private network, a virtual private network, a secure network, and/or a secure portion of network 140. In some embodiments, user devices 100A-C may communicate with one another via short-range wireless technologies, such as near field communication (NFC), Bluetooth, or the like.

Figure 2:
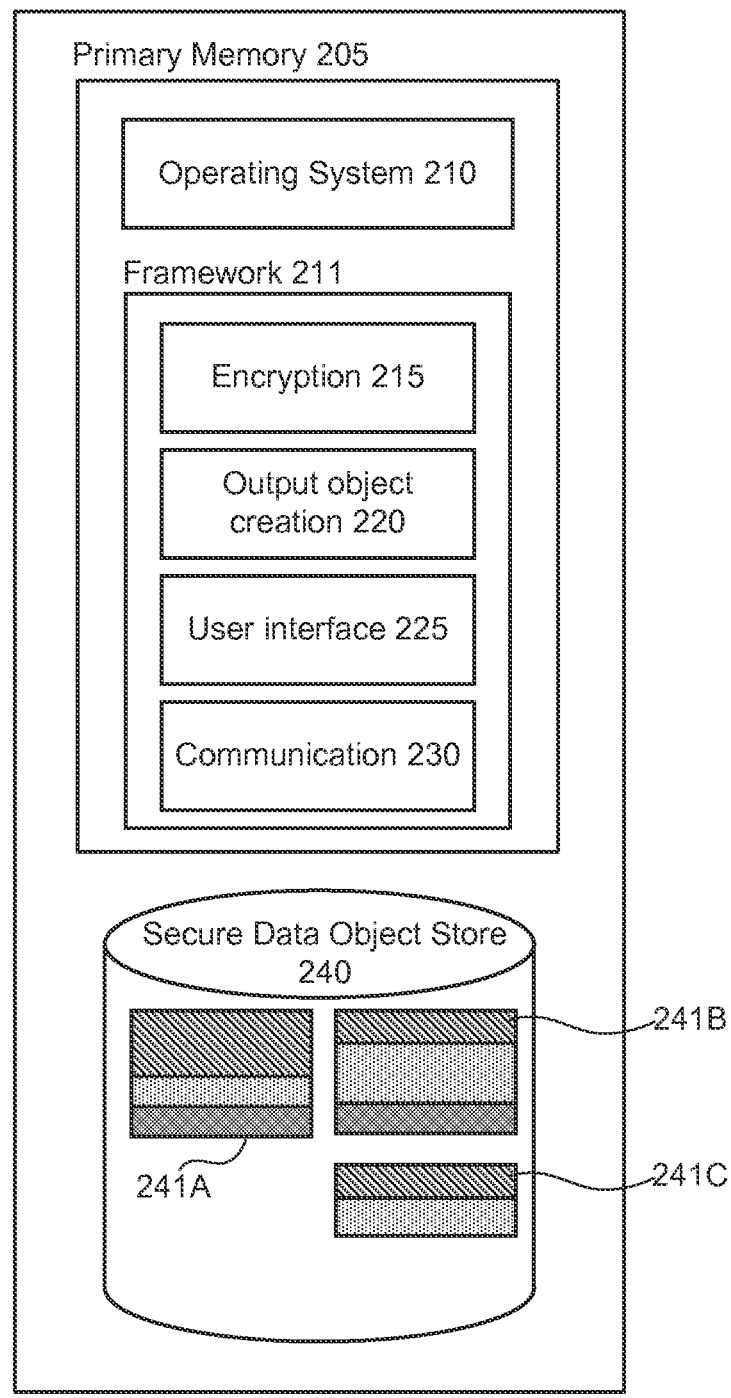
FIG. 2 illustrates in more detail components of one of the user devices of FIG. 1.

FIG. 2 illustrates in more detail components of one of the user devices 100 of FIG. 1. A secure data object store 240 of the user device 100 stores on durable storage in encrypted form the various objects known to a framework 211. As further illustrated with respect to FIG. 3, below, an object 241 in the store 240 comprises a set of properties corresponding to a type of the object, along with corresponding values of those properties. The pairs of properties of an object and their corresponding values have an associated protection level that indicates how accessible the properties and values are. For example, the protection levels determine whether recipients of the object will be able to receive and access those properties and values. The store 240 may additionally store context objects and role objects (discussed in additional detail below). Context objects define a memory space containing a collection of objects. Role objects represent a role that a person may play in a given context, and have associated access rights to other objects. When a user is assigned to a role defined by a role object, that user is afforded the access rights of that role.

The objects 241 may come to be stored in the store 240 in different manners. For example, the user owning the device 100 might use features of a graphical user interface (such as those described later in FIGS. 5A and 5B) to explicitly indicate the type of the object, the values of the properties corresponding to that type, and the protection levels corresponding to the values. Objects may also be received by the store through sharing of objects by other devices 100, through generation of the objects by the actions of other objects, or the like.

Primary memory 205 (e.g., random access memory (RAM)) stores the executing code for a operating system, such as MICROSOFT WINDOWS, APPLE OS X or IOS, ANDROID, LINUX, or the like, in which the framework 211 executes. The primary memory 205 also stores executing code for the framework 211 that ensures secure storage and sharing of data objects. In particular, the framework 211 comprises an encryption module 215 that encrypts an object appropriately for storage on the device 100 or for transfer to another device, an output object creation mod 220 that creates an output object appropriate for sharing at a particular level of access, a user interface module 225 that creates a graphical view of some or all of the objects, as described in more detail below.

In one embodiment, the framework 211 also comprises a communication module 230 that communicates objects and other information with other devices. For example, in some embodiments, the communication module 230 polls for nearby peer devices. In one embodiment, when a device discovers nearby peer devices, the device provides the peer devices with its public key on that the peer devices may in the future securely send objects and other information to it.

Similarly, in some embodiments, the communication module 230 may poll for nearby devices that can be cryptographically identified as being members of a shared "community", connected in a many-to-many mesh. If the devices have not previously established a "community" they may exchange cryptographic keys and process provided identity information by first communicating by (for example) short range wireless and optionally transitioning to middle and/or long range transmissions.

If the network 240 includes a wide-area connection such as the internet, the communication module 230 may also access a trusted registry service that includes the public keys of various other devices executing the framework 211 and hence capable of securely storing and sharing objects, then using those public keys for later communications to those devices, In one embodiment, the communication module 230 generates and reads visual codes such as QR (Quick Response) codes that visually encode a public key on the screen of the device, as a local, secure way to exchange public keys with other devices.

Figure 3:
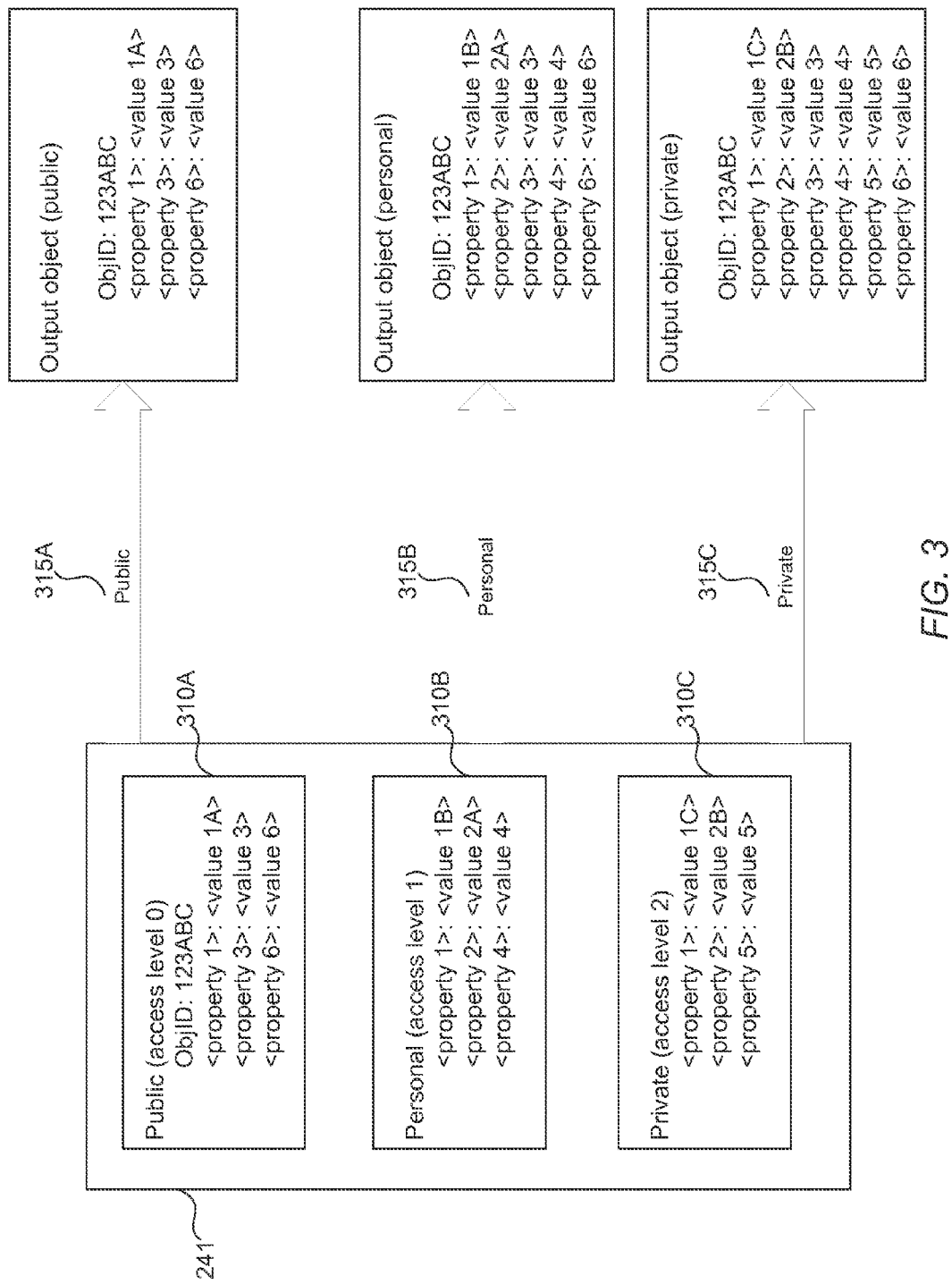
FIG. 3 illustrates a data object having properties with different protection levels, and the creation of different output objects based upon granted protection levels of recipients, according to one embodiment.

FIG. 3 illustrates an object 241 having properties with different protection levels, and the creation of different output objects based upon granted protection levels of recipients, according to one embodiment. An object 241 is of a particular object type, and each object type is associated with one or more properties. In various embodiments, object types represent real-world, tangible or intangible nouns or "things" semantically organized in an ontology or schema. In one embodiment, object types (and their associated properties) may be derived from types provided by schema.org. Other embodiments may employ other schemas and/or ontologies.

In one example embodiment, the most generic type of object is a "Thing", which has properties such as "description", "image", "name", and "url". There are several sub-types of "Thing", including "Person", "Place", "Resource", and the like. The sub-types may in turn have their own sub-types, such as sub-types "Home", "Work", or "School" of type "Place." Each sub-type adds additional sub-type-specific properties, such as a "Work phone" field for the "Work" sub-type.

Different property-value pairs of an object may have different protection levels. The protection levels are specified by the owner of the object—that is, the user who has control of the device 100 on which the object is stored. Specifically, the object 241 depicted in the example of FIG. 3 has three protection levels: a public level 310A, a personal level 310B, and a private level 310C, with the public level being the lowest protection level and private being the highest, although it is appreciated that the number and identity of the protection levels may differ in different embodiments. The different property-value pairs are each assigned to one of the protection levels, with properties 3 and 6 being at the public protection level, property 4 being at the personal protection level, and property 5 being at the private protection level. A property can also have different values appropriate for different protection levels. For example, as illustrated in FIG. 3, property 1 has a first value (1A) at the public protection level, a second value (1B) at the personal protection level, and a third value (1C) at the private protection level; similarly, property 2 has one value (2A) at the personal protection level, and a different value (2B) at the private protection level. As a more concrete example, the value of a middle name attribute might be "Horatio" at a high protection level, and "H." (or nothing) at a lower protection level.

An output object is created for a given object based on an access level of the recipient. When creating the output object, the access level of the recipient is compared to the protection levels of the object. The output object includes the property-value pairs with protection levels at or below the access level of the recipient, but not those with protection levels above the access level of the recipient. For example, output object 320A is the output object created for recipients with the lowest access level (namely, public access), and includes only values of properties of the object 241 that are at the public protection level: namely, the object ID ("123ABC"), and property 3, property 6, and the public value of property 1. In contrast, the output object 320B created for users with an access level of "personal" (a higher protection level than "public") includes the values of all the properties of the object 241 that are at the "personal" protection level (namely, properties 1, 2, and 4), as well as values of properties at the "public" protection level for which there is no corresponding "personal" value. Finally, the output object 320C is created for users with a protection level of "private" (the highest protection level in the illustrated example), and includes values for properties at the "private" protection level, as well as values of properties at the "personal" and "public" level for which there is no corresponding "private" value.

In some embodiments, an object 241 is stored in the secure data object store 240 in encrypted form. Specifically, the encryption module 215 associates a separate key with each protection level of the object and uses that key to encrypt the values of properties of the object at that protection level. Referring again to the example of FIG. 3, for instance, the values 1A, 3, and 6 of properties 1, 3, and 6 from the "public" protection level would be encrypted using one key, the values 1B, 2A, and 4 of properties 1, 2, and 4 from the "personal access" level with another key, and values 1C, 2B, and 5 of properties 1, 2, and 5 from the "private" protection level with yet another key.

In one embodiment, the encryption module 215 generates a separate key for every protection level of every Object. Thus, if there were N objects and M protection levels per object, there would be a total of N*M encryption keys. In another embodiment, separate keys need not be generated for every object. In one embodiment, the keys are themselves encrypted using a value derived from user-provided secrets.

In one embodiment, the property values encrypted at each protection level are protected by a different security scheme that a user is required to satisfy, with higher security protection levels having more complex security schemes, thereby making it increasing more complex for an attacker to gain access to data at higher protection levels. For example, in one example embodiment in which the protection levels are "public", "personal", and "private", the framework 211 does not require any additional verification before allowing access to values of properties with the "public" protection level; accordingly, an attacker trying to gain access to the objects need only have the opportunity to use the device (e.g., physical access and the ability to perform a screen unlock operation) to gain access to the public properties of objects. In contrast, before allowing access to "protected" properties, the framework 211 requires that a user first substantiate the user's identity using techniques such as providing access to an online account or obtaining a suitable response from a cryptographic device inserted into the user device 100. Similarly, in this embodiment the framework 211 requires that the user provide a number of user secrets previously specified by the user, before access to the "private" properties is granted. (Specifically, when initially registering to use the framework, the user provides the answers to the questions, and the framework 211 stores the derived cryptographic secrets in encrypted form.) For example, the required user secrets could include several or all of a name, a password, short text, long text, and an email address. The framework 211 then immediately removes the plaintext values of the provided user secrets from primary memory, replacing the plaintext values with cryptographically-derived values, which are then used to substantiate the user's identity by comparing them to the values cryptographically derived from answers initially provided by the user.

Objects 241 may be stored in primary memory after being accessed (to the extent authorized) in the secure data object store 240. For increased security, in one embodiment the framework 211 reduces the access level of the user of the device—previously established by the techniques for substantiating user identity—in response to certain events, such as the system suspending, the expiration of a PIN that the user entered to establish the user's access level, or the like. As a result of the lowered user access level, some properties may have protection levels such that their values are no longer accessible. Since leaving the values of such properties in primary memory even though they are no longer accessible could increase the risk of a security breach, the framework 211 immediately removes the values of such properties from primary memory, e.g., by overwriting them, and/or by triggering memory management such as memory garbage collection.

Figure 4:
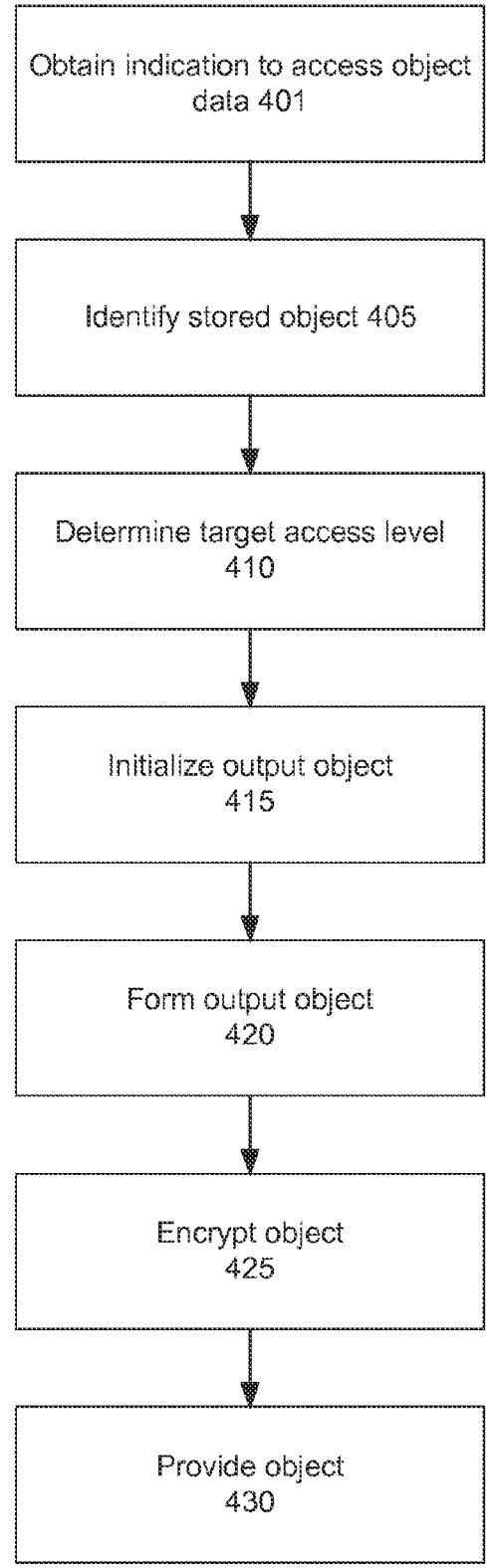
FIG. 4 illustrates operations performed by the output object creation module of FIG. 2 when preparing an object for use at a particular access level, according to one embodiment.

FIG. 4 is a flowchart illustrating operations performed by the output object creation module 220 when preparing an object for use at a particular access level, according to one embodiment. For example, the owner of an object (i.e., the person in control of the device on which the object is stored) may have specified that when sharing with a particular recipient, the object is to be shared at a maximum access level of "personal." In such case, the output object creation module 220 would prepare an output object for sharing with the particular user, where the output object includes values of properties at or below the "personal" protection level i.e., "public" or "personal" properties, but not "private" properties.

In step 401, a request is obtained to access values of properties associated with a source object, the values to be accessed on behalf of a recipient (e.g., a user, person, group, context, or the like). The source object is "owned" or controlled by the user of the device 100. For example, in some embodiments, a user may wish to access an object stored on his or her device to share data with a recipient, or an automated system may attempt to access the object.

In step 405, the output object creation module 220 identifies the source object data, e.g., as stored on secure data object store 240 of the device 100 in encrypted serialized form. In some embodiments, the object is identified by a globally unique identifier ("GUID") or other identifier, which is used to access a file an encrypted file system, record in a database, or other serialized data object within a data store that corresponds to the source data object.

In step 410, the output object creation module 220 determines an access level of the recipient, the access level being the level of access of that the user or "owner" of the serialized data object (as identified in step 405) has assigned to the recipient on whose behalf the data is being accessed.

In step 415, the output object creation mod 220 initializes, generates, and/or otherwise obtains an output object that is capable of storing data up to (but not exceeding) the recipient's user-assigned access level (as determined in step 410) that the user has assigned to the recipient. In one embodiment, the output object is of the same or a similar type as the source data object (as indicated in step 401). For example, if the source data object is a "Person"-type object, than the output object is also a "Person"-type object or an object of a type or class that inherits from, descends from, or is otherwise associated with the "Person" type.

In step 420, the output object creation module 220 forms the output object by including property-value pairs for which the specified access level is at least as great as the protection levels of the properties. In the example of protection levels of "public", "personal", and "private" properties, for instance, an access level of "personal" would include "public" and "personal" property-value pairs, but not property-value pairs with the higher "private" protection level. In one embodiment, in the case of a property with values at multiple protection levels at or below the current access level, the value from each protection level is included in the output object. For example, if a "Middle Name" property had the value "H" at the "public" protection level, and "Horatio" at the "personal" protection level, then the output object created when sharing at the "personal" protection level would include a value, "Horatio," at the "personal" protection level for the "Middle Name" property, and a value, "H.", at the "public" protection level for the "Middle Name" property. In a different embodiment, in the case of values at multiple protection levels for the same property, only the value from the highest protection level is included in the output object.

Once the output object has been populated 420, it may be encrypted 425 by the encryption module 215 for communication to a recipient.

If the recipient is a different user (or, more precisely, a device 100 of a different user), in one embodiment the encryption module 215 generates a new symmetric encryption key for use with the communication. (In some embodiments, an encryption key can be re-used some number of times, such as being reused for communications to the same recipient.) Using the encryption key, the encryption module 215 encrypts the output object. The encryption module 215 also obtains a public key of the recipient, and encrypts the encryption key with the public key. The encrypted output object and the encrypted encryption key are then provided 430 to the device of the recipient, either directly by the framework 211 itself, or by the user, or by a combination of the two. Since the output object is encrypted, it can be provided by diverse mechanisms, such as being sent directly between the framework 211 of the originating device and the framework of the recipient device, being emailed, being shared via a social network, being transferred on a physical medium that is inserted into an input port of the recipient device, or the like.

The framework 211 executing on the recipient's device 100 receives the output object, accesses the recipient's private key, decrypts the encryption key, using the private key, and decrypts the encrypted output object using the encryption key. The framework 211 also ensures that the output objects stored appropriately. For example, in one embodiment the framework 211 on the recipient device 100 stores the property values of the output object at the same protection levels that they had when they were sent to the recipient device. For instance, referring again to the above example, the value "Horatio" would be stored at the "personal" protection level, and the value "H." would be stored at the "public" protection level.

Figure 5A:
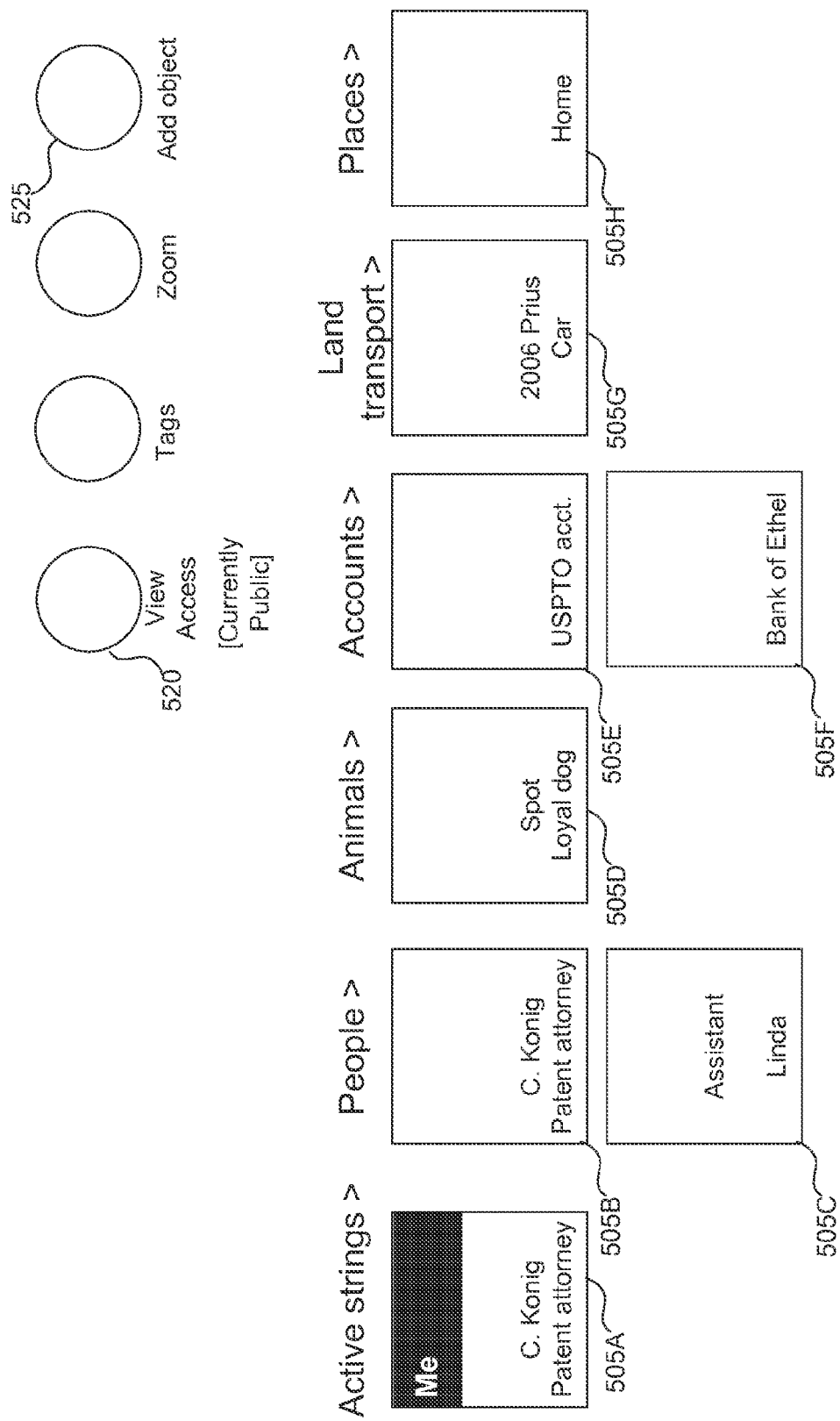
FIGS. 5A and 5B represent a graphical view of a context before and after a change of view access level, according to one embodiment.

One type of receiver of object data is a context, which is a memory space containing a collection of objects viewed at a particular maximum access level. A context is defined by a context object, which includes a list of the objects 241 that are part of the context, as well as other data such as input sources (e.g., information feeds) from which to receive additional data. FIG. 5A illustrates a graphical user interface generated by the user interface module 225 that displays a sample context for a given set of objects. Users can manually specify objects to be added to the store 240 by selecting the user interface element 525 and filling in the object type and property values in user interface regions that are subsequently displayed, along with the protection levels of the values. Visual indications 505 of objects depict the output objects that result from viewing the objects at the access level selected using interface element 520 (e.g., "Public" in the current example). For example, the context includes two People objects (with the names "C. Konig" and "Linda"), an Animal object ("Spot"), two Account objects (to a Wifi wireless networking account, and to a bank account), among other objects. Since the example of FIG. 5A shows that the current access level is "public", only the property information with a "public" protection level will be shown. Thus, for example, a comparatively small amount of information is displayed in the visual indications 505 for the various objects, such as People objects with shortened names ("C. Konig" and "Linda"), and Account objects that omit key information (such as account numbers or passwords).

Figure 5B:
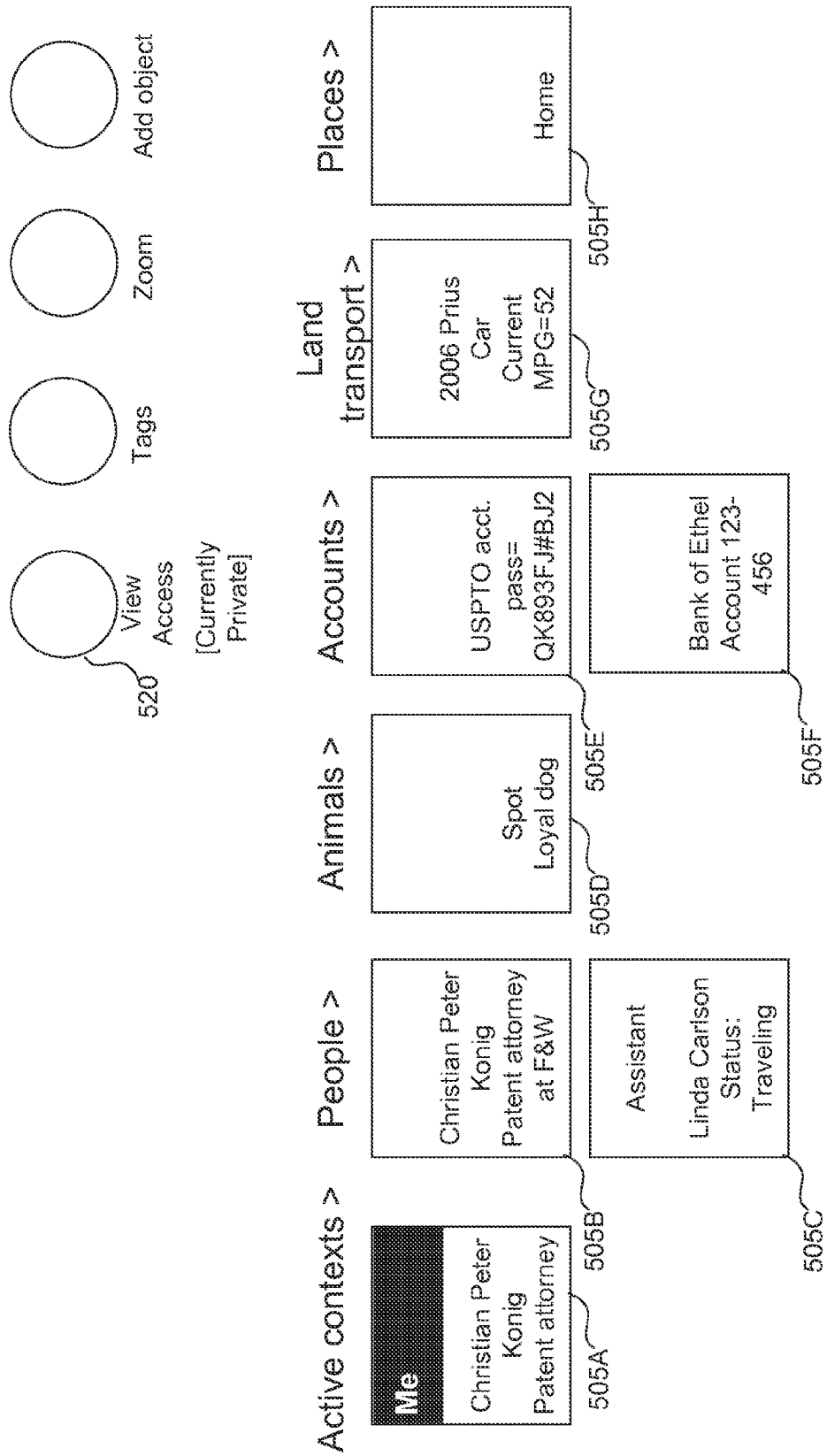

In contrast, FIG. 5B illustrates the graphical user interface of the same sample context that results when the view access level has been changed to "Private" via the user interface element 520, resulting in the visual indications 505 displaying additional and/or different information. For example, the names of People objects in visual indications 505B and 505C have been expanded; a Password property has been displayed for the visual indication 505E of a first Account object and the visual indication 505F of a second Account object.

In one embodiment, the framework 211 supports the use of Role objects. A Role object represents a role that a person may play in a given context, and has associated access rights to other objects in the context. A Role object differs from other types of objects in that it does not store properties of its own, but rather references another object. For example, the object with visual indication 505C in FIG. 5A is a Role object representing an Assistant role, which can be filled by (for example) a Person object, and is currently being filled by a Person named "Linda." The Assistant role might be granted access to other objects in the context (limited to the maximum access level of the specific recipient), such as "Private" access to the Account object with visual indication 505E (which is related to the Assistant's role), but only "Public" access to the Account object with visual indication 505F (which is not related to the Assistant's role). Changing the Person object that fills the Role results in a dynamic substitution of the property values of the new Person for those of the old Person. For example, changing the assistant from a Person with name "Linda" to a Person with name "Jenna" would cause the visual indication 505C of FIG. 5A to display "Assistant Jenna" rather than "Assistant Linda," and would likewise change the additional displayed properties of visual indication 505C of FIG. 5B.

Figure 6:
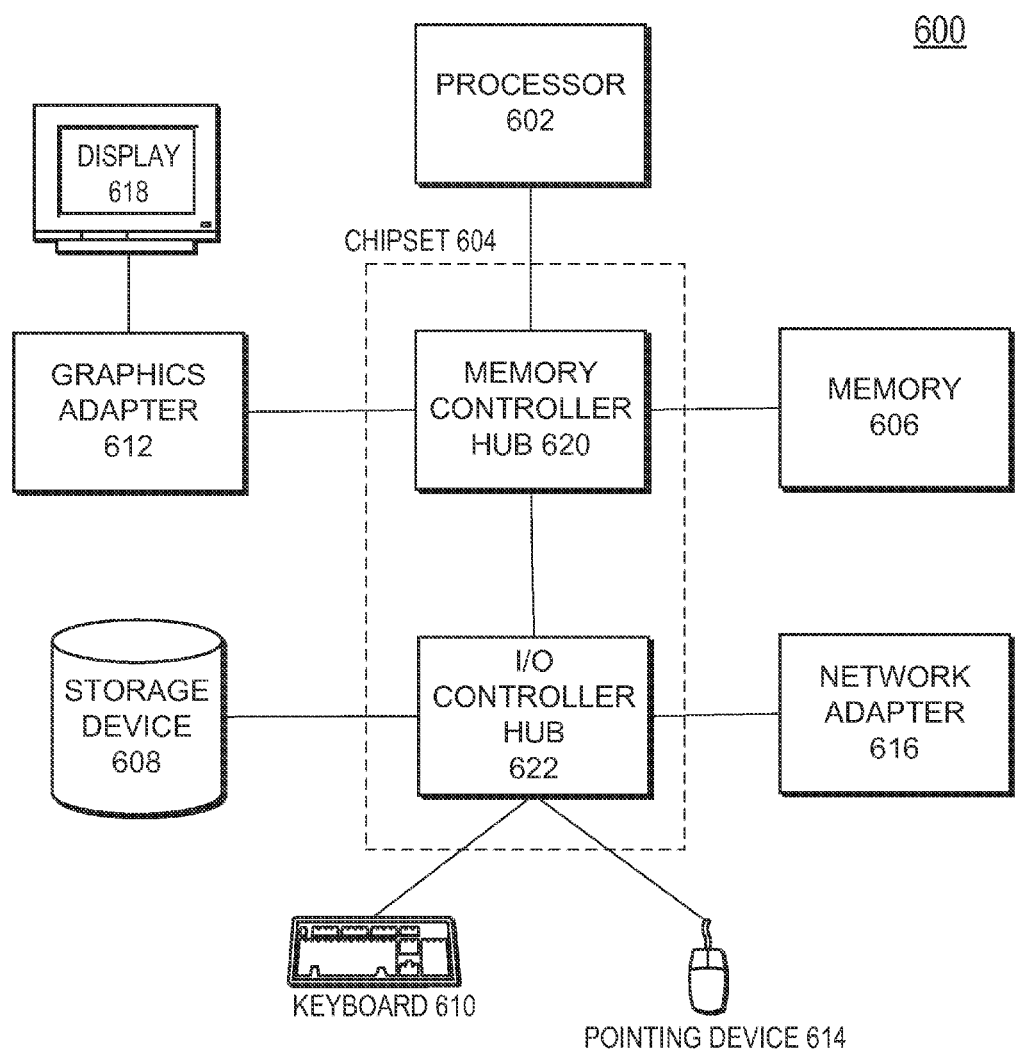
FIG. 6 is a high-level block diagram illustrating physical components of a computer system that can serve as a user device of FIG. 1, according to one embodiment

FIG. 6 is a high-level block diagram illustrating physical components of a computer system 600, which can serve as a user device 100 of FIG. 1, according to one embodiment. Illustrated are at least one processor 602 coupled to a chipset 604. Also coupled to the chipset 604 are a memory 606, a storage device 608, an keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 406 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer 600. The graphics adapter 612 displays images and other information on the display 618. The network adapter 616 couples the computer system 600 to a local or wide area network.

As is known in the art, a computer system 600 can have different and/or other components than those shown in FIG. 64. In addition, the computer 600 can lack certain illustrated components. For example, in one embodiment, if a computer system 600 is a smartphone it may lack a keyboard 610, pointing device 614, and/or graphics adapter 612, and have a different form of display 618. Moreover, the storage device 608 can be local and/or remote from the computer 600 (such as embodied within a storage area network (SAN)).

As is known in the art, the computer system 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

Embodiments of the entities described herein can include other and/or different modules than the ones described here. In addition, the functionality attributed to the modules can be performed by other or different modules in other embodiments. Moreover, the description occasionally omits the term "module" for purposes of clarity and convenience.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in anon-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
   receiving, on at least a first device having a processor and memory, an indication of a type of at least a first object, the type specifying a plurality of corresponding properties;
   receiving, on at least the first device for storage in at least the first object:
   values of a plurality of properties of the first object, the values specified by the type of the first object, and indications of a plurality of corresponding protection levels for the plurality of the properties;
   associating a different encryption key with each of the plurality of protection levels of at least the first object; and
   storing at least the first object, including the values of the plurality of properties in the first object and the indications of the plurality of corresponding protection levels in the first object, on the first device, the values for the properties for each of the protection levels encrypted using the encryption key associated with the protection level.

2. The computer-implemented method of claim 1, further comprising:
   receiving a request to provide a representation of the first object to first recipient different from a first user owning the first object;
   identifying an access level assigned to the first recipient;
   identifying first properties of the first object for which the access level of the first recipient is at least as great as the protection level of the properties;
   forming a first output object corresponding to the first object based on the values of the identified first properties;
   encrypting the first output object for the first recipient; and
   providing the encrypted first output object to the first recipient.

3. The computer-implemented method of claim 2, further comprising forming a second output object corresponding to the first object for a second recipient having an access level lower than the access level of the first recipient, the second output object lacking some of the values of the identified first properties of the first object that are present in the first output object.

4. The computer-implemented method of claim 2, further comprising forming a second output object for a second recipient having an access level lower than the access level of the first recipient, the first output object having a first value for the first property and the second output object having a second value for the first property different from the first value for the first property.

5. The computer-implemented method of claim 1, further comprising:
   responsive to a user substantiating an identity of the user, establishing an access level of the user at a first access level;
   storing, in primary memory, values of properties of the first object with protection levels at or below the first access level;
   reducing an access level of the user to a second access level lower than the first access level;
   identifying properties of the first object having protection levels at or below the first access level but above the second access level; and
   removing values of the identified properties from the first object within primary memory.

6. The computer-implemented method of claim 1, further comprising:
   creating, on the first device, a context object;
   associating the first object and a plurality of other objects with the context object;
   producing a graphical user interface including graphical indications of the first object and of the plurality of other objects associated with the context object.

7. The computer-implemented method of claim 6, further comprising:
   creating a role object representing a role in a context;
   associating with the role object a plurality of objects and a corresponding plurality of access levels for the associated objects;
   associating the role object with the context object; and
   responsive to a user of a set of users accessing the context, displaying within the graphical user interface graphical indications of the plurality of objects associated with the role object, the graphical indications including values of properties of the plurality of objects that are at or below the access levels of the corresponding objects associated with the role object.

8. The computer-implemented method of claim 1, further comprising:
   receiving a request from a user to access the first object at a first access level;
   requiring the user to satisfy a first security scheme in order to access values of properties of the first object having a first one of the protection levels; and
   requiring the user to satisfy a different second security scheme in order to access values of properties of the first object having a second one of the protection levels different from the first one of the protection levels.

9. The computer-implemented method of claim 1, further comprising storing a plurality of objects on the first device, wherein each object is assigned encryption keys different from encryption keys assigned to others of the plurality of objects.

10. The computer-implemented method of claim 1, further comprising, for a second object, associating a different encryption key with each of the plurality of protection levels of the second object, wherein the encryption keys associated with the plurality of protection levels of the first object are different from the encryption keys associated with the plurality of protection levels of the second object.

11. A non-transitory computer-readable storage medium storing instructions executable by a computer processor, the instructions comprising:
   instructions for receiving, on a first device having a processor and memory, an indication of a type of a first object, the type specifying a plurality of corresponding properties;
   instructions for receiving, on the first device for storage in at least the first object:
      values of a plurality of properties of the first object, the values specified by the type of the first object, and
      indications of a plurality of corresponding protection levels for the plurality of the properties;
   instructions for associating a different encryption key with each of the plurality of protection levels of at least the first object; and
   instructions for storing at least the first object, including the values of the plurality of properties in the first object and the indications of the plurality of corresponding protection levels in the first object, on the first device, the values for the properties for each of the protection levels encrypted using the encryption key associated with the protection level.

12. The non-transitory computer-readable storage medium of claim 11, the instructions further comprising:
   instructions for receiving a request to provide a representation of the first object to first recipient different from a first user owning the first object;
   identifying an access level assigned to the first recipient;
   identifying first properties of the first object for which the access level of the first recipient is at least as great as the protection level of the properties;
   forming a first output object corresponding to the first object based on the values of the identified first properties;
   encrypting the first output object for the first recipient; and
   providing the encrypted first output object to the first recipient.

13. The non-transitory computer-readable storage medium of claim 12, the instructions further comprising instructions for forming a second output object corresponding to the first object for a second recipient having an access level lower than the access level of the first recipient, the second output object lacking some of the values of the identified first properties of the first object that are present in the first output object.

14. The non-transitory computer-readable storage medium of claim 12, the instructions further comprising instructions for forming a second output object for a second recipient having an access level lower than the access level of the first recipient, the first output object having a first value for the first property and the second output object having a second value for the first property different from the first value for the first property.

15. The non-transitory computer-readable storage medium of claim 11, the instructions further comprising:
   instructions for, responsive to a user substantiating an identity of the user, establishing an access level of the user at a first access level;
   instructions for storing, in primary memory, values of properties of the first object with protection levels at or below the first access level;
   instructions for reducing an access level of the user to a second access level lower than the first access level;
   instructions for identifying properties of the first object having protection levels at or below the first access level but above the second access level; and
   instructions for removing values of the identified properties from primary memory.

16. The non-transitory computer-readable storage medium of claim 15, the instructions further comprising:
   instructions for creating a role object representing a role in a context;
   instructions for associating with the role object a plurality of objects and a corresponding plurality of access levels for the associated objects;
   instructions for associating the role object with the context object; and
   instructions for, responsive to a user of a set of users accessing the context, displaying within the graphical user interface graphical indications of the plurality of objects associated with the role object, the graphical indications including values of properties of the plurality of objects that are at or below the access levels of the corresponding objects associated with the role object.

17. The non-transitory computer-readable storage medium of claim 11, the instructions further comprising:
   instructions for receiving a request from a user to access the first object at a first access level;
   instructions for requiring the user to satisfy a first security scheme in order to access values of properties of the first object having a first one of the protection levels; and
   instructions for requiring the user to satisfy a different second security scheme in order to access values of properties of the first object having a second one of the protection levels different from the first one of the protection levels.

18. The non-transitory computer-readable storage medium of claim 11, the instructions further comprising storing a plurality of objects on the first device, wherein each object is assigned encryption keys different from encryption keys assigned to others of the plurality of objects.

19. A computer system comprising:
   a computer processor; and
   a storage medium storing instructions executable by a computer processor, the instructions comprising:
      instructions for receiving, on a first device, an indication of a type of a first object, the type specifying a plurality of corresponding properties;
      instructions for receiving, on the first device for storage in the first object:
         values of a plurality of properties of the first object, the values specified by the type of the first object, and
         indications of a plurality of corresponding protection levels for the plurality of the properties;
      instructions for associating a different encryption key with each of the plurality of protection levels of the first object; and
      instructions for storing the first object, including the values of the plurality of properties in the first object and the indications of the plurality of corresponding protection levels in the first object, on the first device, the values for the properties for each of the protection levels encrypted using the encryption key associated with the protection level.

20. The computer system of claim 19, the instructions further comprising:
- instructions for receiving a request to provide a representation of the first object to first recipient different from a first user owning the first object;
- identifying an access level assigned to the first recipient;
- identifying first properties of the first object for which the access level of the first recipient is at least as great as the protection level of the properties;
- forming an output object corresponding to the first object based on the values of the identified first properties;
- encrypting the output object for the first recipient; and
- providing the encrypted output object to the first recipient.

* * * * *